(12) United States Patent
Carver et al.

(10) Patent No.: US 7,081,951 B2
(45) Date of Patent: Jul. 25, 2006

(54) PALM PRINT SCANNER AND METHODS

(75) Inventors: John F. Carver, Palm City, FL (US); George W. McClurg, Jensen Beach, FL (US)

(73) Assignee: Cross Match Technologies, Inc., Palm Beach Gardens, FL (US)

(*) Notice: Subject to any disclaimer, the term of this patent is extended or adjusted under 35 U.S.C. 154(b) by 0 days.

(21) Appl. No.: 10/960,747

(22) Filed: Oct. 8, 2004

(65) Prior Publication Data

US 2005/0105078 A1  May 19, 2005

Related U.S. Application Data

(60) Provisional application No. 60/509,541, filed on Oct. 9, 2003.

(51) Int. Cl.
*G06K 9/74* (2006.01)

(52) U.S. Cl. .................................... 356/71
(58) Field of Classification Search ............... 356/71; 382/127; 359/831
See application file for complete search history.

(56) References Cited

U.S. PATENT DOCUMENTS

| | | |
|---|---|---|
| 1,501,979 A | 7/1924 | Willson |
| 2,146,662 A | 2/1939 | Van Albada |
| 2,184,858 A | 12/1939 | Goodman |
| 3,054,854 A | 9/1962 | Neasham |
| 3,282,152 A | 11/1966 | Myer |
| 3,333,502 A | 8/1967 | Flanagan |
| 3,511,571 A | 5/1970 | Ogle |
| 3,581,282 A * | 5/1971 | Altman ............... 340/5.83 |
| 3,648,240 A | 3/1972 | Jacoby et al. |
| 3,716,301 A | 2/1973 | Caulfield et al. |
| 3,765,018 A | 10/1973 | Heard et al. |
| 3,804,524 A | 4/1974 | Jocoy et al. |
| 3,806,706 A | 4/1974 | Haaslinger et al. |
| 3,882,462 A | 5/1975 | McMahon |
| 4,032,889 A | 6/1977 | Nassimbene |
| 4,128,837 A | 12/1978 | Page |

(Continued)

FOREIGN PATENT DOCUMENTS

JP  3-161884  7/1991

(Continued)

OTHER PUBLICATIONS

English abstract for Japanese Patent Publication No. 3-161884, published Jul. 7, 1991, 1 page, from http://v3.espacenet.com.

(Continued)

*Primary Examiner*—Michael P. Stafira
(74) *Attorney, Agent, or Firm*—Sterne, Kessler, Goldstein & Fox P.L.L.C.

(57) ABSTRACT

A live print scanner includes a transparent tray platen apparatus and a scanning system. The transparent tray platen apparatus includes a base region attached to two rounded side regions. The base region of the tray platen assembly includes a convex portion. A hand is placed atop the base region adjacent to one of the two rounded side regions such that the hand's palm pocket is atop the convex portion. A sensor assembly within the rotary scanning system generates a complete image of a palm print pattern. Because of the side regions and the convex portion, the image generated includes an image of a print pattern on the palm pocket as well as on the side of the palm. A holographic element may be disposed in a light path between an illumination source and the sensor.

16 Claims, 14 Drawing Sheets

U.S. PATENT DOCUMENTS

| | | | |
|---|---|---|---|
| 4,180,306 A | 12/1979 | Duhrkoop et al. | |
| 4,206,441 A | 6/1980 | Kondo | |
| 4,206,556 A | 6/1980 | Sabo et al. | |
| 4,215,274 A | 7/1980 | Segall | |
| 4,357,597 A | 11/1982 | Butler | |
| 4,387,365 A | 6/1983 | Berry et al. | |
| 4,414,684 A | 11/1983 | Blonder | |
| 4,420,261 A | 12/1983 | Barlow et al. | |
| 4,461,576 A | 7/1984 | King | |
| 4,467,545 A | 8/1984 | Shaw, Jr. | |
| 4,578,793 A | 3/1986 | Kane et al. | |
| 4,611,881 A | 9/1986 | Schmidt et al. | |
| 4,637,718 A | 1/1987 | Kirchner et al. | |
| 4,684,802 A | 8/1987 | Hakenewerth et al. | |
| 4,688,092 A | 8/1987 | Kamel et al. | |
| 4,701,960 A | 10/1987 | Scott | |
| 4,720,869 A | 1/1988 | Wadia | |
| 4,736,203 A | 4/1988 | Sidlauskas | |
| 4,736,436 A | 4/1988 | Yasukawa et al. | |
| 4,751,660 A | 6/1988 | Hedley | |
| 4,751,759 A | 6/1988 | Zoell | |
| 4,774,516 A | 9/1988 | Henri et al. | |
| 4,783,167 A | 11/1988 | Schiller et al. | |
| 4,790,025 A | 12/1988 | Inoue et al. | |
| 4,792,226 A * | 12/1988 | Fishbine et al. | 356/71 |
| 4,794,260 A | 12/1988 | Asano et al. | |
| 4,805,117 A | 2/1989 | Fiore et al. | |
| 4,821,118 A | 4/1989 | Lafreniere | |
| 4,925,300 A | 5/1990 | Rachlin | |
| 5,140,469 A | 8/1992 | Lamarre et al. | |
| 5,146,102 A * | 9/1992 | Higuchi et al. | 250/556 |
| 5,225,924 A | 7/1993 | Ogawa et al. | |
| 5,249,370 A | 10/1993 | Stanger et al. | |
| 5,307,264 A | 4/1994 | Waggener et al. | |
| 5,309,274 A | 5/1994 | Akanabe | |
| 5,313,306 A | 5/1994 | Kuban et al. | |
| 5,367,399 A | 11/1994 | Kramer | |
| 5,377,002 A | 12/1994 | Malin et al. | |
| 5,440,428 A | 8/1995 | Hegg et al. | |
| 5,452,135 A | 9/1995 | Maki et al. | |
| 5,469,289 A | 11/1995 | Iwao et al. | |
| 5,526,436 A * | 6/1996 | Sekiya | 382/115 |
| 5,528,355 A * | 6/1996 | Maase et al. | 356/71 |
| 5,588,097 A | 12/1996 | Ono et al. | |
| 5,610,751 A | 3/1997 | Sweeney et al. | |
| 5,629,764 A * | 5/1997 | Bahuguna et al. | 356/71 |
| 5,638,461 A | 6/1997 | Fridge | |
| 5,650,842 A | 7/1997 | Maase et al. | |
| 5,677,763 A | 10/1997 | Redmond | |
| 5,677,782 A | 10/1997 | Peng | |
| 5,699,186 A | 12/1997 | Richard | |
| 5,761,330 A * | 6/1998 | Stoianov et al. | 382/127 |
| 5,777,751 A | 7/1998 | Ward | |
| 5,796,426 A | 8/1998 | Gullichsen et al. | |
| 5,798,923 A | 8/1998 | Laskowski | |
| 5,825,474 A | 10/1998 | Maase | |
| 5,892,599 A * | 4/1999 | Bahuguna | 359/15 |
| 5,937,102 A | 8/1999 | Jin | |
| 6,021,007 A | 2/2000 | Murtha | |
| 6,038,332 A | 3/2000 | Fishbine et al. | |
| 6,041,134 A | 3/2000 | Merjanian | |
| 6,046,867 A | 4/2000 | Rana | |
| 6,175,407 B1 * | 1/2001 | Sartor | 356/71 |
| 6,198,429 B1 | 3/2001 | Fujikawa et al. | |
| 6,198,836 B1 | 3/2001 | Hauke | |
| 6,243,488 B1 | 6/2001 | Penna | |
| 6,341,028 B1 | 1/2002 | Bahuguna et al. | |
| 6,373,969 B1 | 4/2002 | Adler | |
| 6,394,356 B1 | 5/2002 | Zagami | |
| 6,411,441 B1 | 6/2002 | Videen | |
| 6,415,064 B1 | 7/2002 | Oh | |
| 6,424,470 B1 | 7/2002 | Lindner | |
| 6,459,451 B1 | 10/2002 | Driscoll, Jr. et al. | |
| 6,466,686 B1 | 10/2002 | Senior | |
| 6,496,608 B1 | 12/2002 | Chui | |
| 6,616,065 B1 | 9/2003 | Martin | |
| 6,928,195 B1 | 8/2005 | Scott et al. | |
| 2002/0049714 A1 | 4/2002 | Yamazaki et al. | |
| 2002/0141620 A1 | 10/2002 | Monden | |
| 2003/0012417 A1 | 1/2003 | Hamid | |
| 2003/0099022 A1 | 5/2003 | Karin et al. | |
| 2003/0142856 A1 * | 7/2003 | McClurg et al. | 382/124 |
| 2003/0197853 A1 * | 10/2003 | Fenrich | 356/71 |
| 2003/0206287 A1 * | 11/2003 | McClurg et al. | 356/71 |
| 2004/0109245 A1 | 6/2004 | McClurg et al. | |
| 2004/0109589 A1 | 6/2004 | McClurg et al. | |
| 2004/0109591 A1 * | 6/2004 | McClurg et al. | 382/127 |
| 2004/0114785 A1 | 6/2004 | McClurg et al. | |
| 2004/0114786 A1 | 6/2004 | Cannon et al. | |
| 2004/0161136 A1 | 8/2004 | McClurg et al. | |

FOREIGN PATENT DOCUMENTS

| | | | |
|---|---|---|---|
| WO | WO 96-17480 A2 | 6/1996 | |
| WO | WO 96-17480 A3 | 6/1996 | |

OTHER PUBLICATIONS

International Search Report and Written Opinion (dated Jul. 13, 2005) related to PCT/US04/33400, filed Oct. 12, 2004.

International Search Report (dated Aug. 17, 2004) related to PCT/US03/38536, filed Dec. 4, 2003.

International Search Report (dated Apr. 21, 2004) related to PCT/US03/38644, filed Dec. 5, 2003.

* cited by examiner

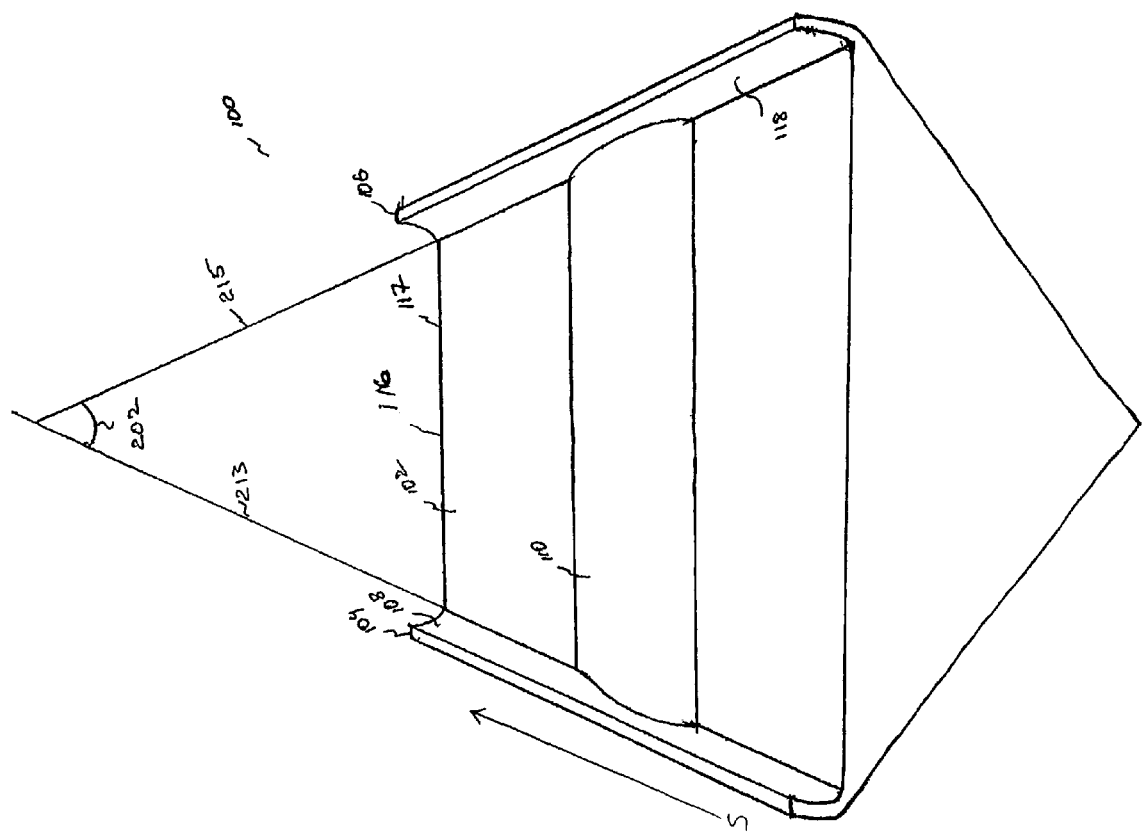

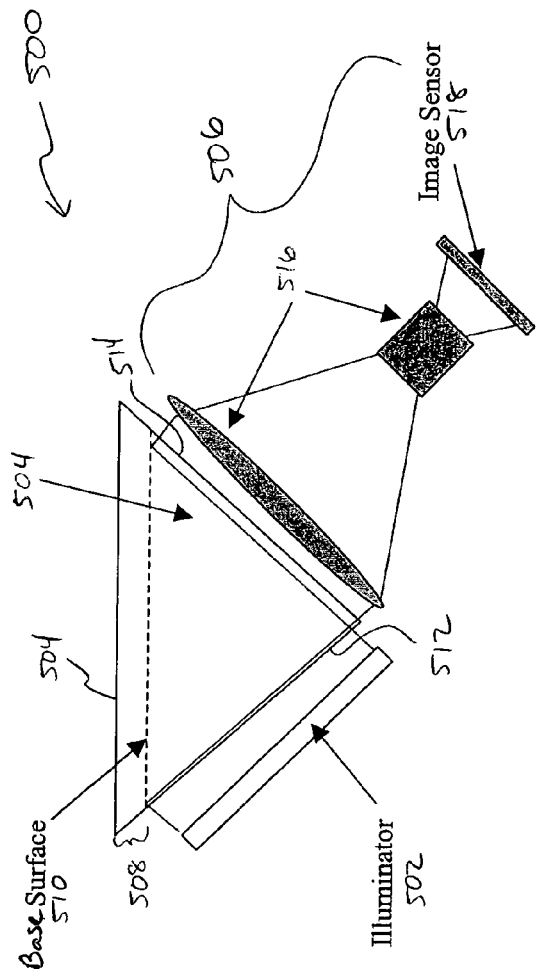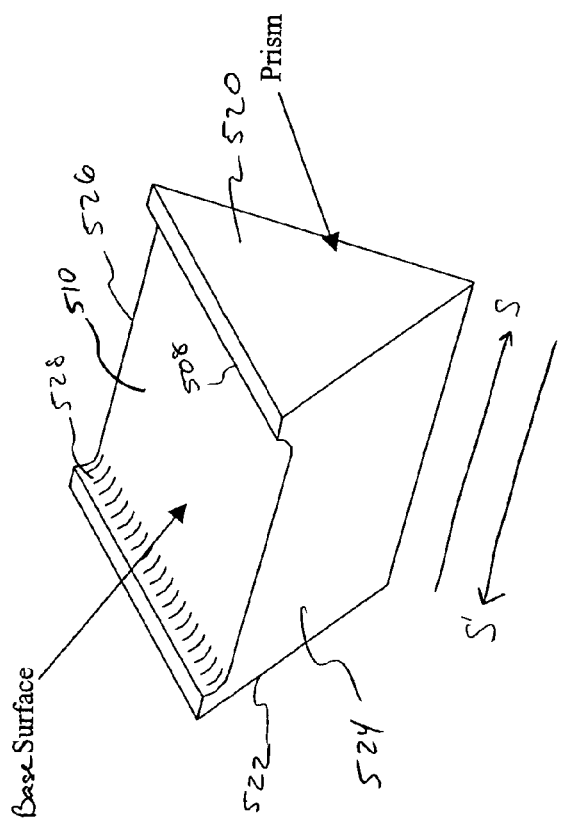
FIG. 5A
FIG. 5B

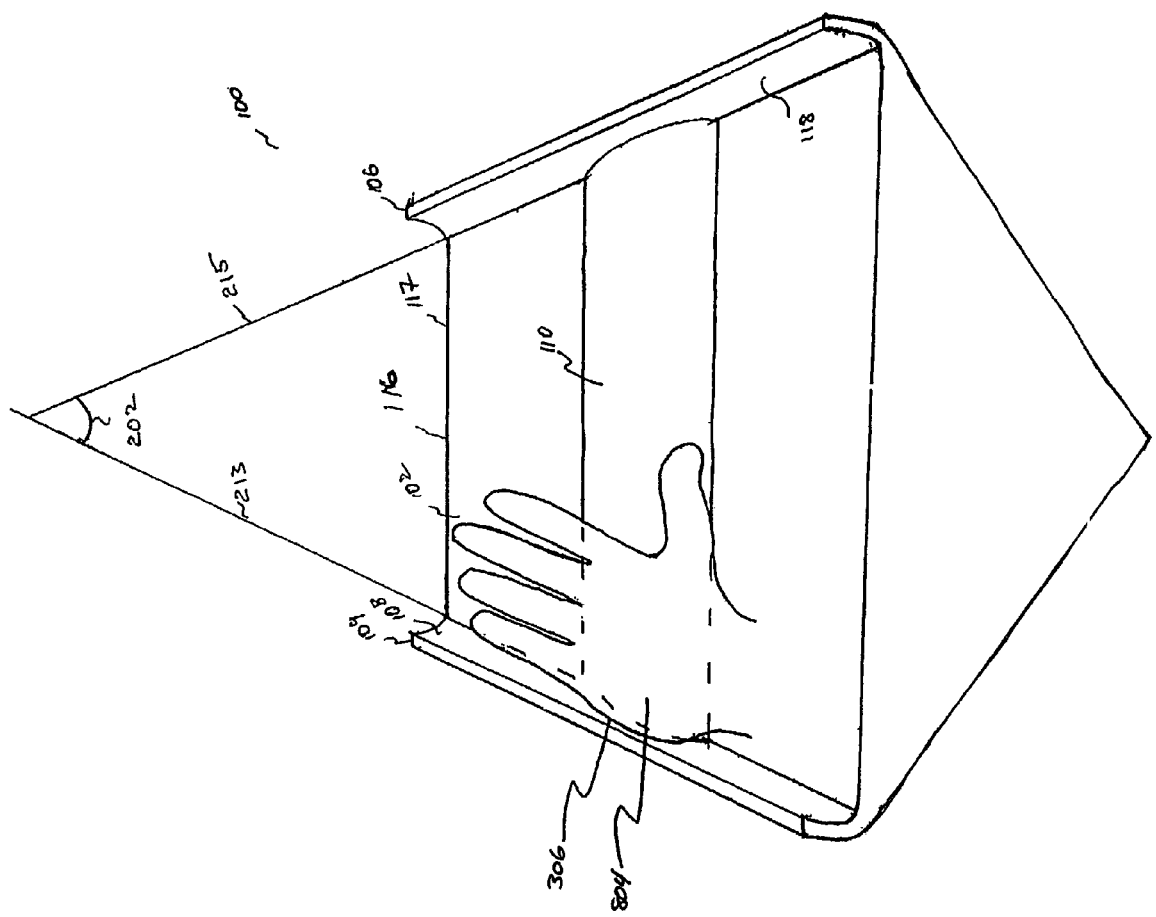

PALM PRINT SCANNER AND METHODS

CROSS REFERENCE TO RELATED APPLICATIONS

This application claims the benefit of U.S. Provisional Application No. 60/509,541, filed Oct. 9, 2003, hereby incorporated by reference herein in its entirety.

BACKGROUND OF THE INVENTION

1. Field of the Invention

The present invention relates to the field of biometrics. More specifically, the present invention relates to live scanning of prints.

2. Background Art

Print imaging systems can capture images of prints on thumbs, fingers, palms, toes, feet, and/or hands. Such print imaging systems are also referred to as live scanners, live print scanners, or simply scanners. Live scanners often include a light source, platen and camera. An object having a print pattern is placed on the platen. A platen is often one planar surface of a prism. The light source illuminates the platen. The camera captures an image of a print placed on the platen.

Many live print scanners utilize the optical principle of frustrated total internal reflection (TIR) to capture a high-quality image of a print pattern. Such a print pattern includes ridges and valleys that make up all or part of a print. For example, ridges on a finger can operate to alter the refraction index at a platen surface compared to valleys, thereby interrupting the TIR of light at the platen surface. This interruption in the TIR causes a high quality optical image representative of the ridges and valleys of a print pattern to be captured by a camera.

One problem with conventional palm live scanner systems is that a palm naturally curves, while a typical platen has a flat planar surface upon which a palm is placed. Thus, there is a chance that not all portions of the palm print, especially the pocket in a center of a palm, will be imaged during scanning. If this occurs, a "dead spot" can occur at the palm pocket and biometric information can be lost.

Another problem is the difficulty in capturing an image of a print pattern on the outer edge of the palm located opposite the thumb (also called the writer's palm). When a palm is placed on a planar platen, the print pattern of the writer's palm does not contact the platen surface; rather, it extends upward away from the platen. As a result, the print pattern on the side of the palm including the writer's palm can only be captured in a separate scan from the scan of the main palm itself. Two scans is expensive, more complex, and burdensome to palm print scanner users.

Attempts have been made to provide a convex or non-planar platen that better fits the shape of a palm pocket. See, U.S. Pat. Nos. 5,526,436 and 5,528,355. Such attempts, however, do not overcome the above-mentioned problems.

BRIEF SUMMARY OF THE INVENTION

The present invention provides systems and methods for live palm print scanning. In an embodiment, a live scanner includes a transparent tray platen apparatus and a scanning assembly. The transparent tray platen apparatus includes a base region attached to two side regions (e.g. right and left side regions). Together, the base region and side regions form a scanning surface. Each side region has a curvature. The curvature can be any type of curve that can receive a side edge of a palm. In one example, the curvature is a concave, arcuate shape that approximates the curve on the side of a hand opposite a thumb. The base region may further include a convex portion placed on top of or formed into the base region. The convex portion can be any type of convex curve upon which a palm can be placed. In one example, the convex portion extends straight along a first direction between the side edges and has a convex top surface that curves along a second direction such that palms of either hand can be placed on the convex top surface. Further, the palm of a left hand can be placed on the convex top surface abutting the left side edge, while the palm of the right hand can be placed on the convex top surface abutting the right side edge of the transparent tray platen apparatus.

When a hand is placed on the scanning surface of the transparent tray platen apparatus, the scanning assembly moves along the outside surface of the transparent tray platen apparatus. The scanning assembly may move, for example, along the side of the platen having the curvature, or the scanning assembly may move across the platen apparatus between the sides having the curvature. Alternatively, the scanning assembly may scan around the curvature. The light source in the sensor assembly illuminates the transparent tray platen apparatus at an angle incident to the outside surface of the transparent tray platen apparatus. The focusing optics and the detector detect an image of the palm placed on the scanning surface, by scanning the side and/or base regions of the tray to capture the complete palm.

One of the advantages of the present invention is substantial elimination of the "dead spot". By placing the hand with its palm pocket atop the convex surface, the dead spot is substantially eliminated. Furthermore, because of the presence of side edges in the tray platen apparatus, an image of a print pattern on the side of the hand can be obtained. In other words, a complete image of the palm print pattern on the inner surface of a palm and the side edges of the palm can be captured in a single scan.

The present invention also provides for a method of imaging both hands of an individual. In an embodiment, the hands are imaged sequentially. In this embodiment, a first hand is placed against the appropriate side of the platen with the palm resting on top of the convex surface. If the first hand is the left hand, the first hand is placed against the left side of the platen; if the first hand is the right hand, the first hand is placed against the right side of the platen. The first hand is then imaged in a scan. After imaging, the first hand is removed and the second hand is placed against the appropriate side of the platen with the palm resting on top of the convex surface. The second hand is then imaged in a scan.

In another embodiment, both the first hand and the second hand are placed against their respective sides of the platen, with the palm of each hand on top of the convex surface. The hands are then imaged in the same scan.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 2 is a top view of another tray platen apparatus according to an embodiment of the present invention.

FIG. 5A is a side view of a system for print capturing according to another embodiment of the present invention.

FIG. 5B is a top view of the tray platen apparatus of FIG. 5A.

FIG. 8B is another illustration of example hand placement for palm print capturing according to an embodiment of the present invention.

The present invention will be described with reference to the accompanying drawings. The drawing in which an element first appears is typically indicated by the leftmost digit(s) in the corresponding reference number.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 3A:
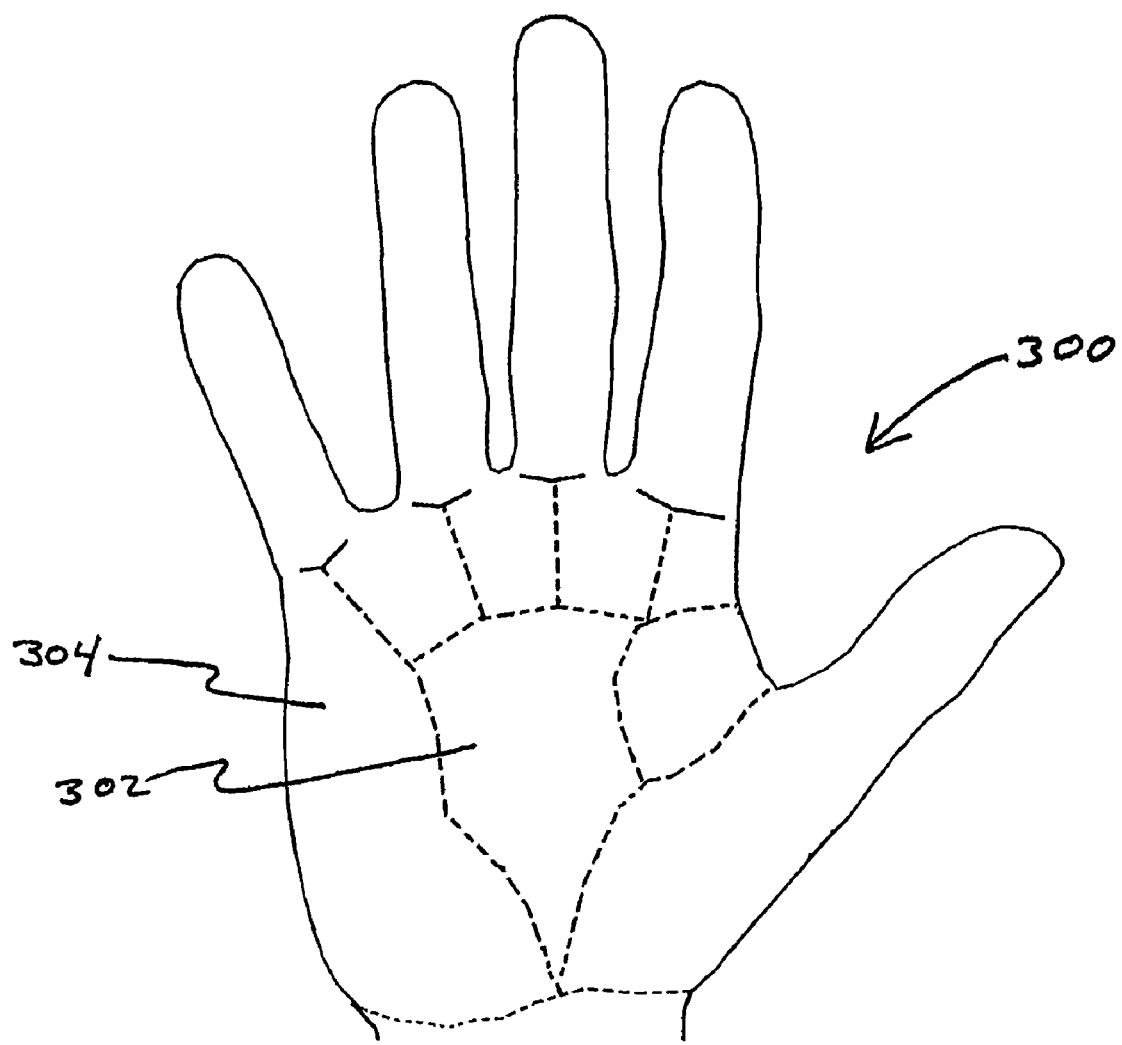
FIG. 3A illustrates sections on an inner surface of a palm.
Figure 3B:
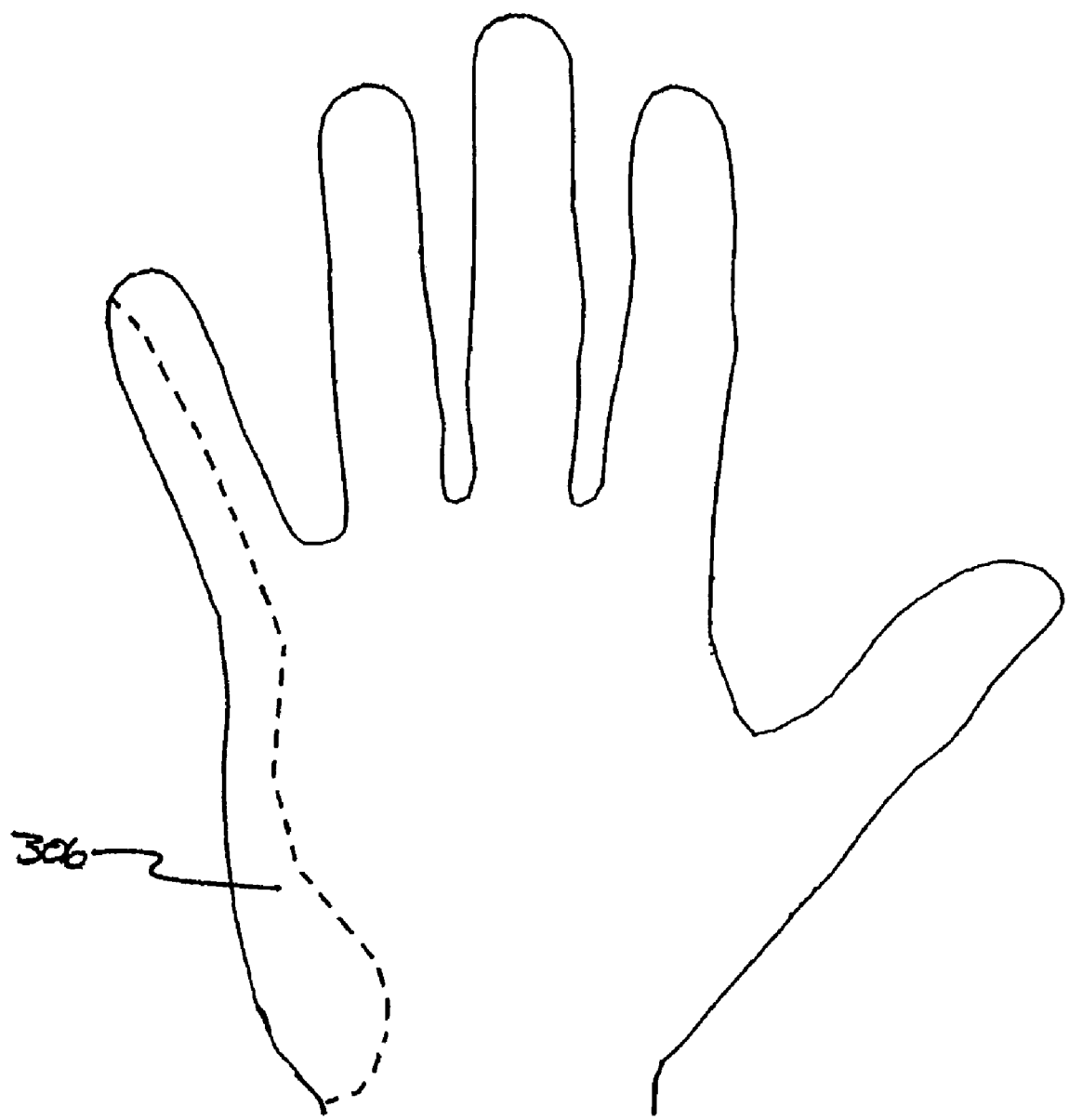
FIG. 3B illustrates a section on a side of a palm.

FIGS. 3A and 3B illustrate different sections of a user's palm that can be imaged with the present invention. FIG. 3A illustrates various sections of an inner surface of a palm 300. Palm pocket 302 is located in the center of palm 300. Hypothenar region 304 is located on the portion of the palm opposite the thumb. FIG. 3B illustrates a writer's palm 306 on palm 300. Writer's palm 306 is part of hypothenar region 304, and refers to the area which, for example, normally rests against paper when the user is writing. Writer's palm 306 includes a print pattern (ridges and valleys) that extend from hypothenar region 304 up along the side of the hand.

Figure 1A:
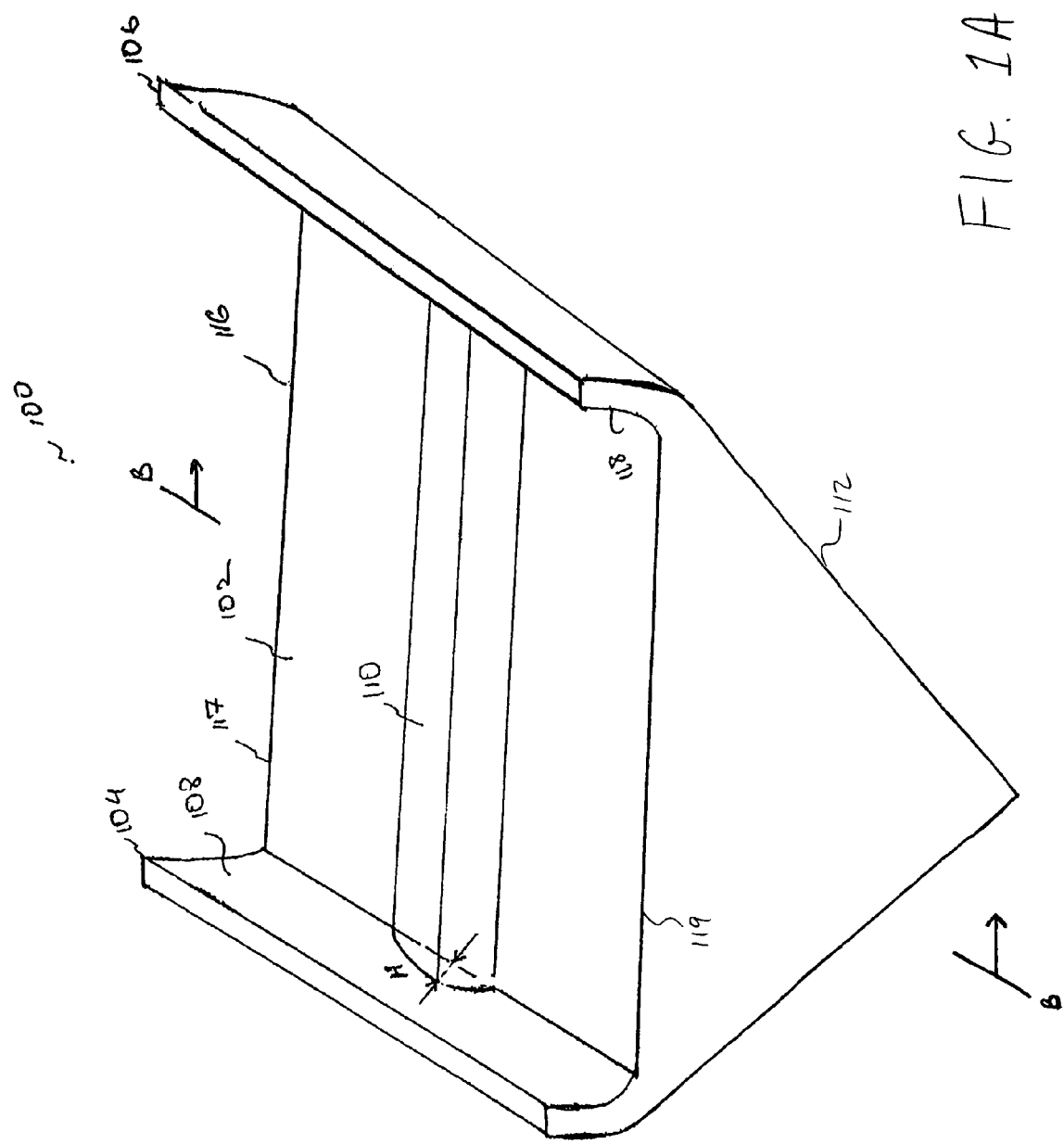
FIG. 1A is a top view of a tray platen apparatus according to an embodiment of the present invention.

FIG. 1A is a top view of a transparent tray platen apparatus 100 for imaging a palm such as palm 300. Transparent tray platen apparatus 100 is an optical element including a first side region 104, a second side region 106, and a base region 116 attached to the first side region 104 and the second side region 106. First side region 104 includes a first inner scanning or platen surface 108. Second side region 106 includes a second inner scanning or platen surface 118. Base region 116 forms a base scanning or platen surface. Base region 116 includes a bottom surface 112 and a top surface 102. The top surface 102 of the base region 116 includes a convex portion 110. The top surface 102 and the bottom surface 112 lie between a first edge 117 and a second edge 119. Transparent tray platen apparatus 100 and all its components can be manufactured from a transparent material capable of passing a beam of light to enable detection of a palm print image. Examples of transparent materials are plastic, glass, or other suitable optical materials.

The first inner scanning surface 108 has a curvature. The shape of the curvature is application specific. For example, the curvature can be any type of curve that can receive a side region of a palm. In one embodiment, the curvature is a concave, arcuate shape that approximates the curve on the side of a hand between the palm and the side of the palm opposite the thumb. Similarly, the second inner scanning surface 118 has another curvature having similar properties described above. In this way, when a palm is placed against the curvature, the print pattern on the side of the palm will make contact with a surface 108 or 118 at the region of curvature.

Figure 1B:
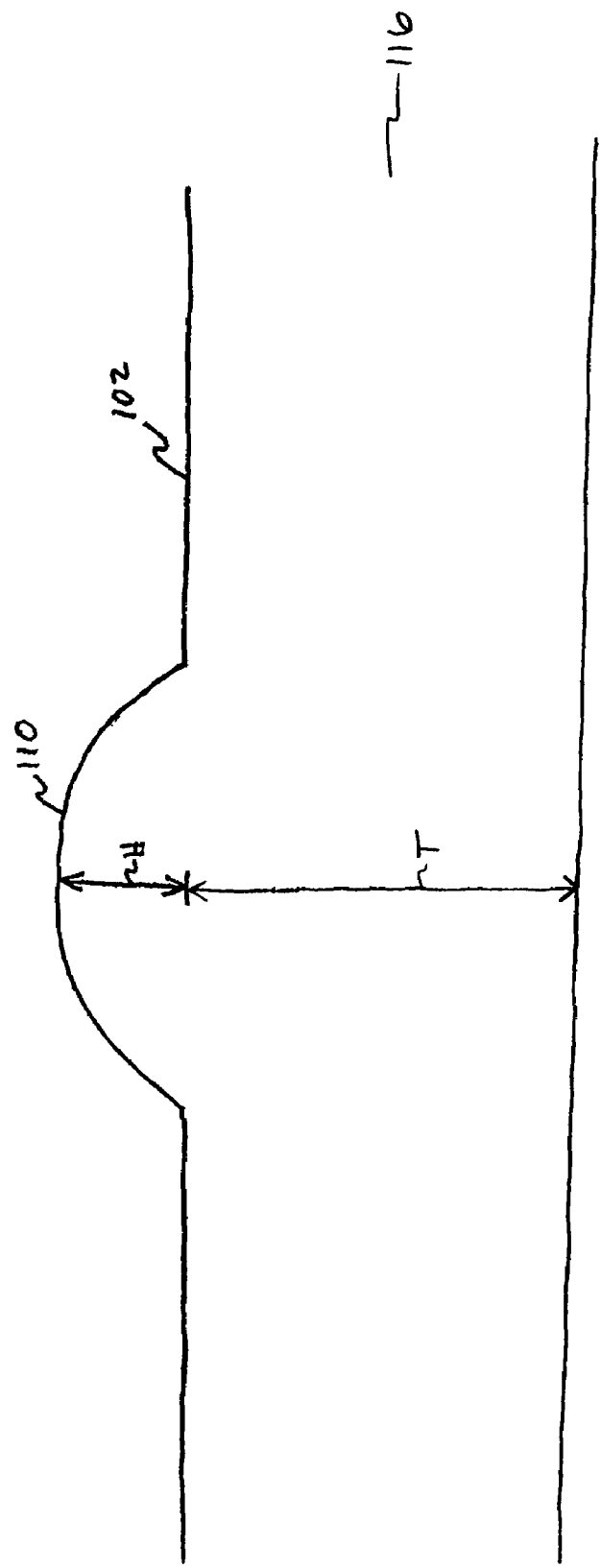
FIG. 1B is a cross-sectional view of FIG. 1A along line B.

In an embodiment, the convex portion 110 extends between the first side region 104 and the second side region 106. Furthermore, as shown in FIG. 1B, convex portion 110 is characterized by height H. Height H is a distance from the highest point of the convex portion 110 through to top surface 102 of the base region 116 as shown in FIG. 1B. If convex portion 110 is uniform between first and second side regions 104 and 106, the height H is also uniform between regions 104 and 106. In alternative embodiments, convex portion 110 can have variable shape, size and height with respect to the top surface 102 of the base region 116. In other embodiments, convex portion 110 can be located on any portion of top surface 102 of the base region 116. For example, as is shown in FIG. 1B, convex portion 110 can have a semi-spherical shape and be located substantially in the center of top surface 102. Convex portion 110 can be omitted in other embodiments, especially if a flat surface 102 is acceptable.

In an embodiment, convex portion 110 is added to flat surface 102. This results in a seam between convex portion 110 and flat surface 102. In another embodiment, convex portion 110 is an area of extra thickness in base region 116, and is not a separate element. That is, there is no seam between convex portion 110 and base region 116. In this embodiment, if base region 116 has a thickness T at areas not encompassed by convex portion 110, convex portion 110 has a thickness (H+T), as shown in FIG. 1B.

Although transparent tray platen apparatus 100 is shown in FIG. 1A as having a first side region and a second side region, a person of skill in the art will recognize that tray platen apparatus 100 in another embodiment may have only one side region for scanning one hand at a time.

FIG. 1A illustrates an embodiment of transparent tray platen apparatus 100, where first side region 104 and second side region 106 are approximately parallel to one another and perpendicular to convex portion 110. In other embodiments, transparent tray platen apparatus 100 can have a tapered design where first side region 104 and second side region 106 are not parallel, as shown in FIG. 2. In a tapered design, an angle 202 is formed between a first axis 213 and a second axis 215, on which first side region 104 and second side region 106 are located, respectively. Angle 202 can be set to a desired size depending upon a particular application. The tapered design helps reduce the amount of material needed in transparent tray platen apparatus 100 and provides a shape that more easily guides placement of a user's hand within transparent tray platen apparatus 100.

Referring to FIG. 2, an operation of transparent tray platen apparatus 100 is described. A user standing in front of transparent tray platen apparatus 100 places the inner surface of her hand atop surface 102 of base region 116 and between first side region 104 and second side region 106. The user preferably places her hand with the palm pocket over the convex portion 110. Furthermore, depending on whether the user scans her right or her left hand, she places her hand adjacent to the appropriate side region. Specifically, if the user scans her right hand, then she places her right hand adjacent second inner scanning surface 118 of second side region 106 while maintaining the palm pocket of her right hand atop the convex portion 110. A scanning system scans all or part of the platen surface of transparent tray platen apparatus 100 to capture a complete image of a print pattern on the palm. The scanning direction may be, for example, the direction of arrow S.

This complete captured image includes the print pattern on the right hand palm and its sides including the writer's palm. If the user scans her left hand, then she places her left hand adjacent to first inner scanning surface 108 of first side region 104 while maintaining the palm pocket of her left hand atop the convex portion 110. A scanning system scans all or part of the platen surface of transparent tray platen apparatus 100 to capture a complete image of a print pattern on the palm. This complete image includes the print pattern on the left hand palm and its sides including the writer's palm. Methods of scanning and hand placement using transparent tray platen apparatus 100 are described in further detail below with respect to FIGS. 7, 8A, 8B, and 8C. A person of skill in the art given this description will recognize that both hands may be placed on transparent tray platen apparatus 100 and scanned in a single scan.

In other embodiments, the transparent tray platen apparatus 100 can have a variety of material types, forms, shapes, sizes and thicknesses. The present invention is not limited to the shape of transparent tray platen apparatus 100 shown in FIGS. 1 and 2. Furthermore, any material or combination of materials, including but not limited to glass or plastic, may be used when manufacturing transparent tray platen apparatus 100, as long as the material is capable of passing through enough light to enable detection of the palm image. For example, both uncoated and coated tray platens can be used. An example optically transparent coating for a tray platen is silicone, although a person of skill in the art will recognize that other types of coatings may be used. The present invention can also be used for scanning feet. In this case, the size of the transparent tray platen apparatus 100 as well as the size and shape of the convex portion 110 can be varied accordingly.

Figure 4A:
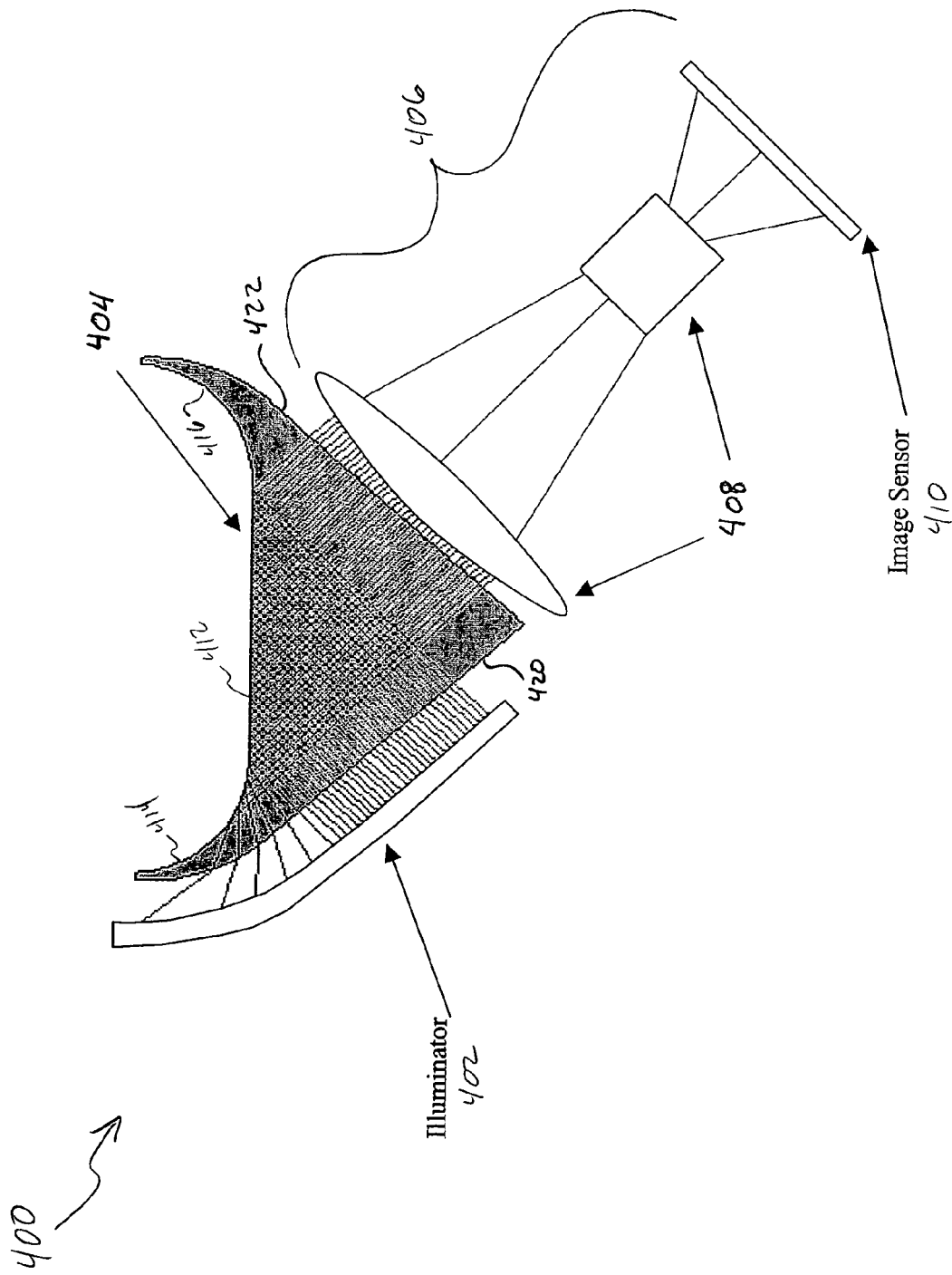
FIG. 4A is a cross-sectional view of a system for print capturing according to an embodiment of the present invention.

FIG. 4A is a cross-sectional view of a scanning system 400 according to an embodiment of the present invention. System 400 includes an illuminator 402, a transparent tray platen apparatus 404, and a sensor assembly 406. Sensor assembly 406 may include, for example, optical elements 408 and image sensor 410. Illuminator 402 illuminates platen apparatus 404. Illuminator 404 may include one or more light emitters. Illuminator 402 may be stationary and illuminate the entire surface of platen apparatus 404. Alternatively, illuminator 402 may move with sensor assembly 406 as sensor assembly 406 scans a resultant image.

Illuminator 402 and sensor assembly 406 may be large enough to, respectively, direct light and image reflected light from both curved side surfaces 414 and 416 and base surface 412. If sensor assembly 406 is only capable of imaging one curved side surface with a portion of the base surface in a single scan, multiple scans may be used to provide images of each curved side surface 414 and 416 and base surface 412. In this embodiment, a first scan may be performed on a first side of platen apparatus 404, such as side 420 that includes curved side surface 414, with a second scan being performed on a second side of platen apparatus 404, such as side 422 that includes curved side surface 416. Alternatively, two illuminators and sensor assemblies may be used. In this embodiment, a second illuminator may be placed opposite illuminator 402 relative to platen apparatus 404, with a second sensor assembly placed opposite sensor assembly 406 relative to platen apparatus 404. Utilizing two illuminators and sensor assemblies enables multiple scans to be made simultaneously or sequentially, providing images of both curved side surfaces 414 and 416 with base surface 412.

In a bright-field illumination embodiment, when a palm is placed in contact with top surface 412 of platen apparatus 404 and adjacent to either first side surface 414 or second side surface 416, the TIR within platen apparatus 404 is broken by the ridges of the palm. The contrast between the ridges and valleys form an image that can be viewed by image sensor 410. In this embodiment, ridges may appear relatively dark while valleys and background areas may appear relatively bright in the captured print image.

Alternatively, depending upon the orientation of the incident light, as in dark-field illumination, the light source may not be directly imaged by the optical elements and the image sensor. In a dark-field illumination embodiment, the captured print is directly illuminated, and light entering the print ridges are diffused and reflected back into the prism in the areas where the print ridges contact the platen surface and break TIR. The light reflected from the ridges are imaged by the optical elements and the image sensor, such as optical elements 408 and image sensor 410, thereby reproducing a representative print image. The valleys and background areas may appear relatively dark while ridges may appear relatively bright in the captured print.

In areas where TIR is not broken, illumination light from illuminator 402 reflects off of surface 412 towards sensor assembly 406. After leaving platen apparatus 404, the reflected light, carrying the print image, is focused by, for example, one or more optical elements 408. Focusing optics 408 focus the light onto image sensor 410, which then detects the print image.

If sensor assembly 406 includes a linear detector, the image appears as a thin line representing the surface structure of the palm at one specific time. If sensor assembly 406 includes an array detector, the image appears as a two dimensional (2-D) image. If sensor assembly 406 does not include an array detector that can image the entire platen at once, sensor assembly 406 will scan down the side of platen apparatus 404 (into or out of the page in the perspective of FIG. 4A). The position of image sensor 410 and resultant image data may be input to a suitable electronic subsystem. This position data and image data may then be processed to generate a 2-D image of the palm surface.

Figure 4B:
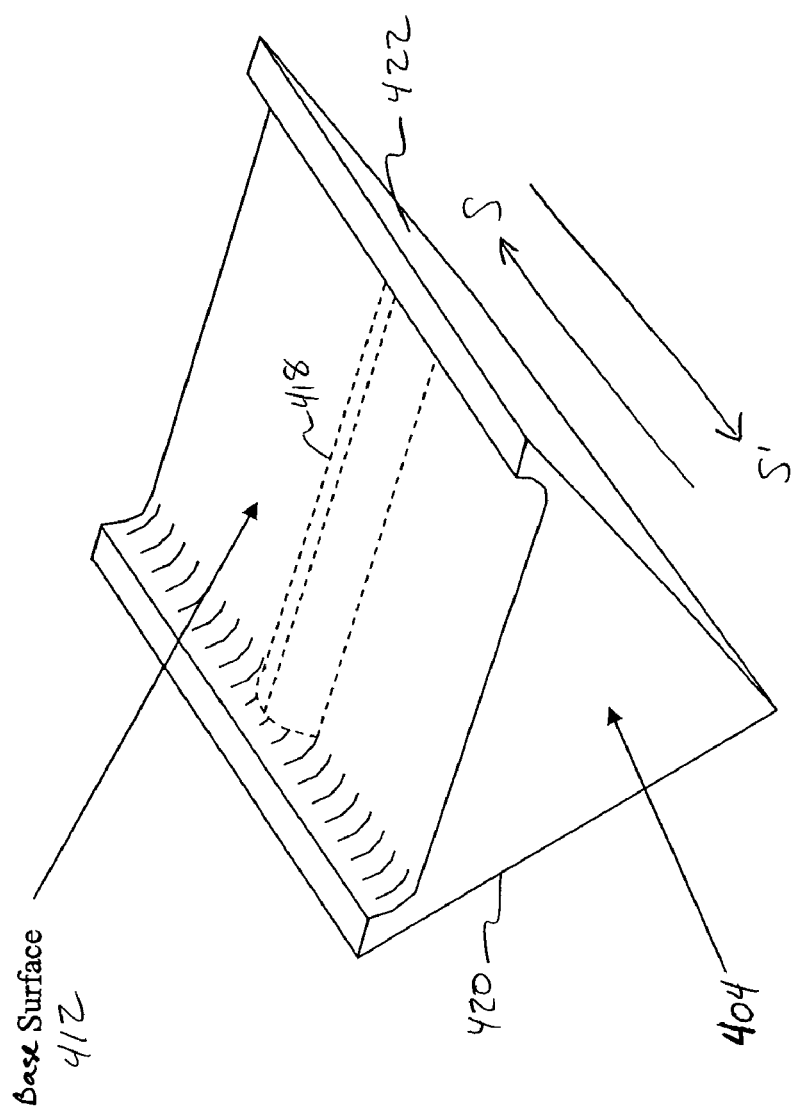
FIG. 4B is top view of the tray platen apparatus of FIG. 4A.

FIG. 4B is a top view of platen apparatus 404. Arrows S and S' show example scanning directions of sensor assembly 406. Convex portion 418 may or may not be included in platen surface 412. Because of the geometry of platen apparatus 404 and depending on the size of sensor assembly

406, prints from base surface 412, side surfaces 414 and 416, and convex portion 418 (if included) can all be viewed in the same image by sensor assembly 406.

FIG. 5A is a side view of a scanning system 500 according to another embodiment of the present invention. Scanning system 500 includes an illuminator 502, platen apparatus 504, and sensor assembly 506. Illuminator 502 may be any type of illuminator, such as that described with respect to FIG. 4A. As the view in FIG. 5A is from a side of platen apparatus 504 that includes side scanning surface 508, base scanning surface 510 cannot be seen directly in FIG. 5A.

FIG. 5B is a top view of platen apparatus 504. Side 520 is, in this example, the side viewed in FIG. 5A. Side 520 includes side scanning surface 508. Side 522 includes side scanning surface 528.

In scanning system 400, illuminator 402 and sensor assembly 406 are located opposite surfaces of platen apparatus 404 that include side scanning surfaces 414 and 416. In contrast, in scanning system 500, illuminator 502 and sensor assembly 506 are placed next to surfaces 524 and 526 that extend between sides 520 and 522.

Sensor assembly 506 may include one or more optical elements 516 and image sensor 518. Image sensor 518 detects light from illuminator 502 that has been totally internally reflected by platen surfaces 510, 508, and 528. If sensor assembly 506 does not include an array detector that can image the entire platen at once, sensor assembly 506 will scan across platen apparatus 504. Arrows S and S' show example scanning directions of sensor assembly 506. As described with respect to FIG. 4A, if the sensor assembly is only capable of imaging a single curved side surface with a portion of the base surface, multiple scans and/or multiple detectors may be used to assemble images of both side surfaces 508 and 528 and base surface 510.

Figure 6:
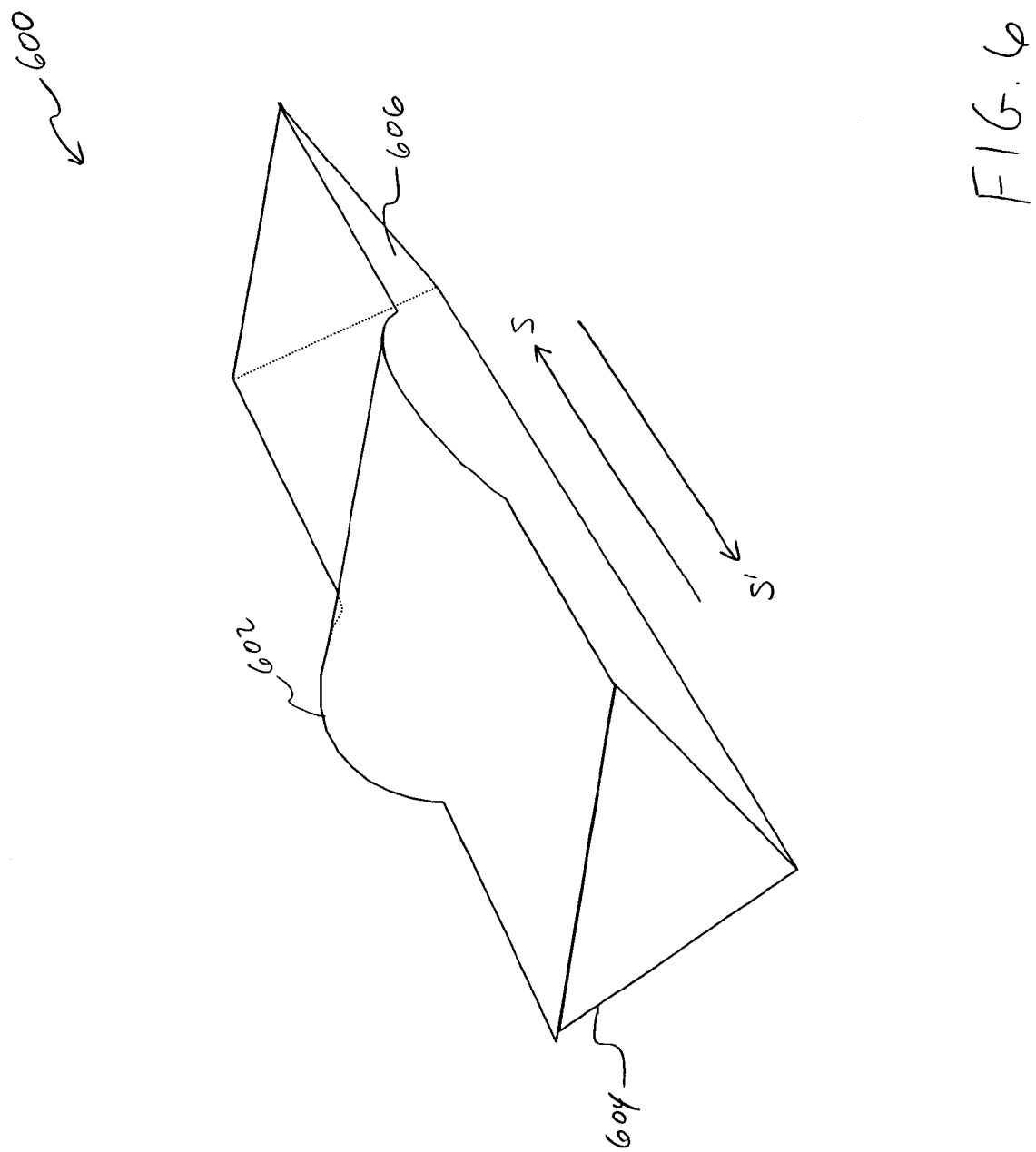
FIG. 6 is a top view of a tray platen apparatus according to an embodiment of the present invention.

FIG. 6 is a top view of platen apparatus 600 according to another embodiment of the present invention. Platen apparatus 600 does not include curved side scanning surfaces. Platen apparatus 600 does include, however, a convex portion 602. Thus, platen apparatus 600 can image a palm pocket of a hand. An illuminator and a sensor assembly may be placed opposite each other on sides 604 and 606. Arrows S and S' show example scanning directions of a sensor assembly.

Figure 9:
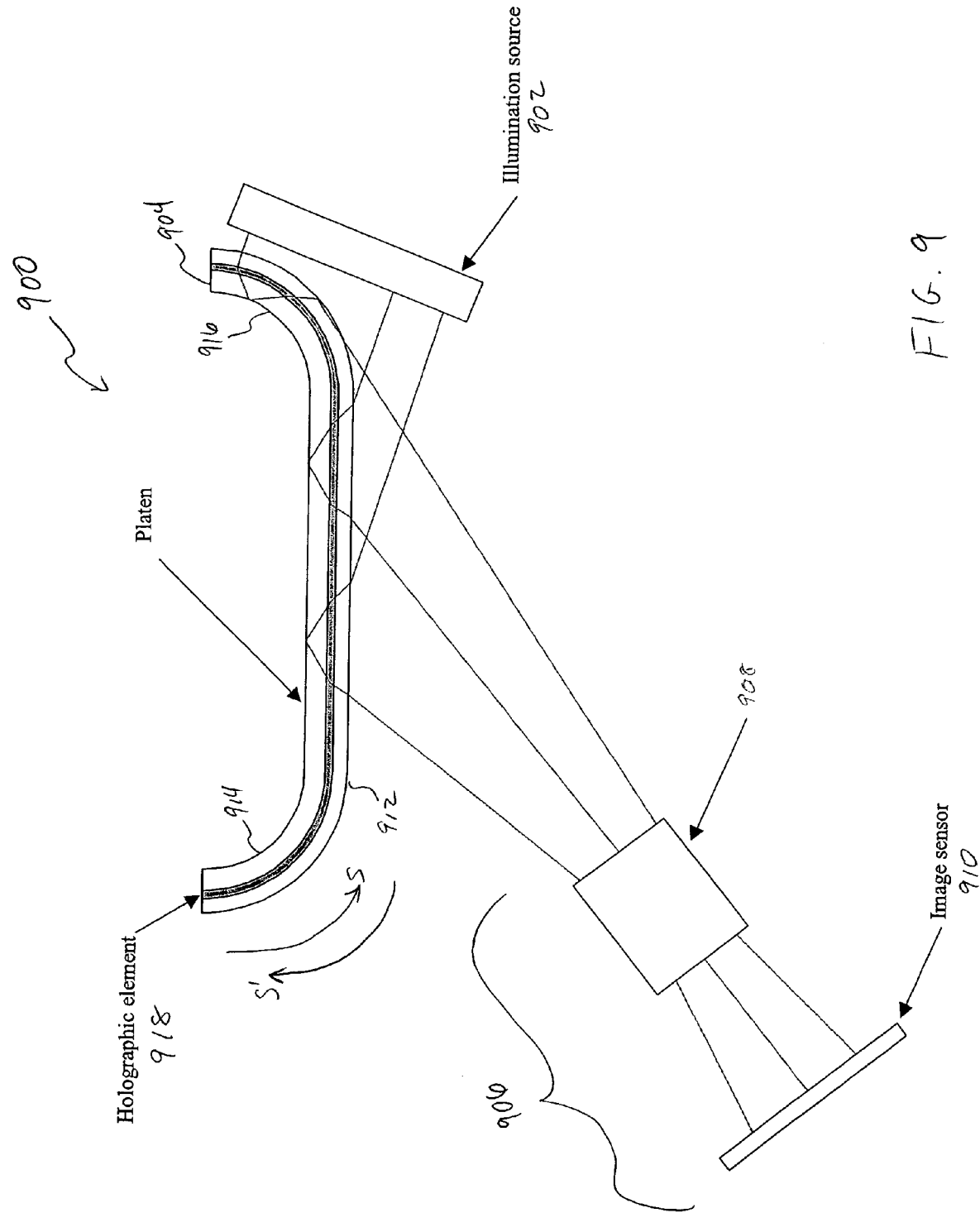
FIG. 9 is a cross-sectional view of a system for print capturing according to another embodiment of the present invention.

FIG. 9 is a cross-sectional view of a scanning system 900 according to yet another embodiment of the present invention. Scanning system 900 includes an illumination source 902, a platen apparatus 904, and sensor assembly 906. Sensor assembly 906 may include one or more optical elements 908 and an image sensor 910.

Instead of the base region extending in a prismatic shape, base region 912 between curved side regions 914 and 916 may be flat. So that light is reflected properly through platen apparatus 904, platen apparatus 904 includes a holographic element 918. Although holographic element 918 is illustrated in FIG. 9 as coupled within platen apparatus 904, a person of skill in the art will recognize that holographic element 918 may instead be coupled to either the bottom or top surface of platen apparatus 904, or otherwise disposed in the light path between illumination source 902 and image sensor 910. A person of skill in the art will also recognize that holographic element 918 may be made up of multiple individual holographic elements. Platen apparatus 904 may also include a convex portion (not shown) for contacting the palm pocket of a hand.

Because of the special nature of holographic materials, holographic element 918 adjusts the path of light from illumination source 902 such that the effects of TIR are preserved within platen apparatus 904. A print image can thus be reflected from the platen surface to sensor assembly 906 for imaging by image sensor 910.

If image sensor 910 cannot view the entire print image, sensor assembly 906 and illumination source 902 may scan around the outside surface of base region 912 and side regions 914 and 916. Arrows S and S' show example scanning directions of sensor assembly 906. Alternatively or additionally, sensor assembly 906 may scan down the length of platen apparatus 904 (into or out of the page from the perspective of FIG. 9). In other alternatives, multiple scans or multiple sensor assemblies may be used, as described with respect to FIG. 4A.

Figure 7:
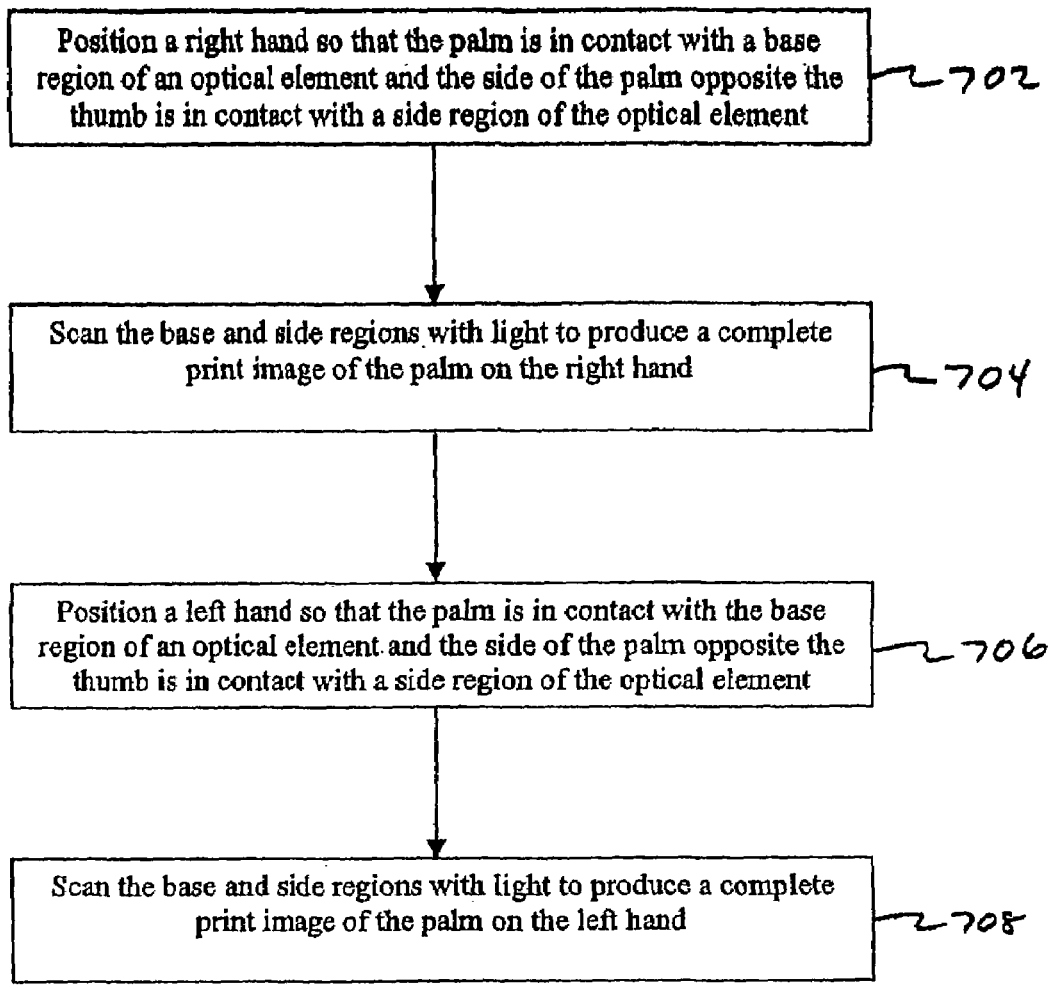
FIG. 7 is a flowchart of a method according to an embodiment of the present invention.

FIG. 7 is a flowchart of a method 700 according to an embodiment of the present invention. In step 702, a right hand is positioned so the palm is in contact with a base region of an optical element, such as convex portion 110 of base region 116, and the side of the palm opposite the thumb is in contact with a side region of the optical element, such as inner scanning surface 118. In step 704, the base and side regions are scanned with light to produce a complete print image of the palm on the right hand.

In step 706, a left hand is positioned so the palm is in contact with a base region of the optical element, such as convex portion 110 of base region 116, and the side of the palm opposite the thumb is in contact with a side region of the optical element, such as inner scanning surface 108. In step 708, the base and side regions are scanned with light to produce a complete print image of the palm on the left hand.

One of skill in the art will recognize that the left hand may be imaged before the right hand. One of skill in the art will also recognize that the left and right hands may be imaged in the same scan instead of sequential scans when transparent tray platen apparatus 100 is sufficiently large. If the hands are imaged in the same scan, steps 702 and 706 are combined, and steps 704 and 708 are combined.

Figure 8A:
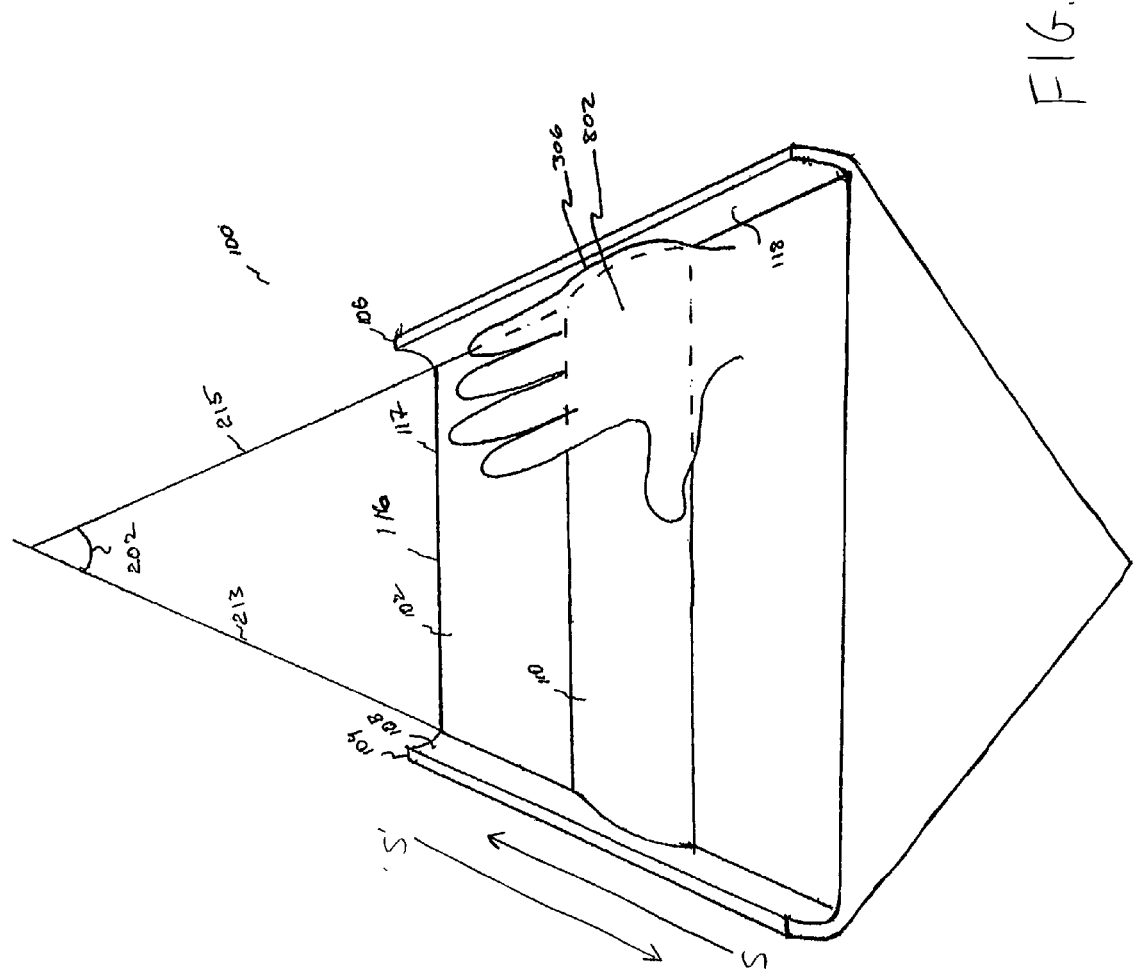
FIG. 8A is an illustration of example hand placement for palm print capturing according to an embodiment of the present invention.
Figure 8C:
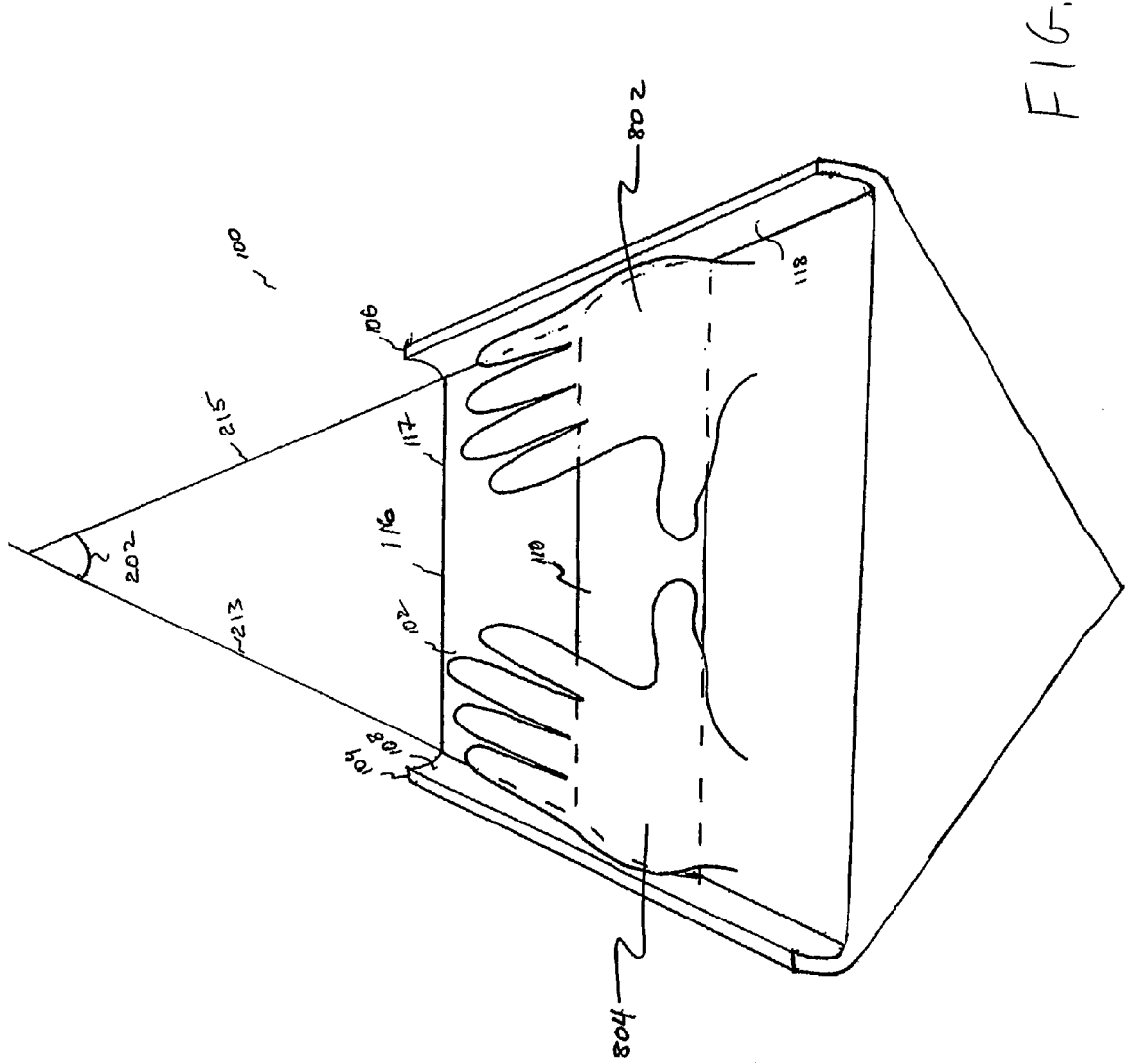
FIG. 8C is an another illustration of example hand placement for palm print capturing according to an embodiment of the present invention.

FIGS. 8A, 8B, and 8C show how transparent tray platen apparatus 100 may be used in accordance with method 700. FIG. 8A shows a right hand 802 positioned in accordance with step 702 of method 700. In FIG. 8A, the palm is in contact with convex portion 110 of base region 116. The side of the palm opposite the thumb, also referred to as the writer's palm 306, is in contact with inner scanning surface 118 of side region 106. Arrows S and S' show example scanning directions. Other scanning directions can be used, such as those described with respect to FIGS. 5 and 6.

FIG. 8B shows a left hand 804 positioned in accordance with step 706 of method 700. In FIG. 8B, the palm is in contact with convex portion 110 of base region 116. The writer's palm 306 is in contact with inner scanning surface 108 of side region 104.

FIG. 8C shows the embodiment where both hands are imaged in the same scan.

Although FIGS. 8A, 8B, and 8C are illustrated using the embodiment described with respect to scanning system 400, a person of skill in the art will recognize that other scanning embodiments, such as those described with respect to systems 500 and 900, may also be used without departing from the spirit and scope of the present invention.

As described herein, the present invention can be used to detect a print pattern on any part of a body in one or more scans including, but not limited to, all or part of a palm (left or right) or both left and right palms, all or part of a hand (left or right) or both left and right hands, all or part of a foot (left or right) or both left and right feet, and all or part of individual digits or groups of digits on either or both hands or feet.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An optical element for use in a system for scanning a hand, comprising:
   a base region sized and shaped to be in contact with a palm of a hand; and
   a first side region sized and shaped, and positioned with respect to the base region, to be in contact with a side of the hand while the palm is in contact with the base region, wherein the first side region is configured to produce a print image of the side of the hand responsive to light directed through the first side region to a side platen surface thereof in contact with the side of the hand.

2. The optical element of claim 1, wherein the base region is configured to produce a print image of the palm responsive to light directed through the base region to a base platen surface thereof in contact with the palm.

3. The optical element of claim 2, wherein the base region is configured to produce the print image of the palm as a result of total internal reflection of the light within the base region.

4. The optical element of claim 1, wherein the first side region is configured to produce the print image of the side of the hand as a result of total internal reflection of the light within the first side region.

5. The optical element of claim 1, wherein at least one of the base region and the first side region includes a coating comprising an optically transparent material.

6. The optical element of claim 5, wherein the optically transparent material is silicone.

7. An optical element for use in a system for scanning a hand, comprising:
   a base region sized and shaped to be in contact with a palm of a hand;
   a first side region sized and shaped, and positioned with respect to the base region, to be in contact with a side of a second hand while a palm of the second hand is in contact with the base region.
   a second side region sized and shaped, and positioned with respect to the base region, to be in contact with a side of a second hand while a palm of the second hand is in contact with the base region.

8. The optical element of claim 7, wherein the second side region is positioned opposite the first side region.

9. An optical element for use in a system for scanning a hand, comprising:
   a base region sized and shaped to be in contact with a palm of a hand;
   a first side region sized and shaped, and positioned with respect to the base region, to be in contact with a side of the hand while the palm is in contact with the base region; and
   at least one holographic element coupled to the base region and the first side region.

10. An optical element for use in a system for scanning first and second hands, comprising:
    a first base region sized and shaped to be in contact with a palm of the first hand;
    a first side region sized and shaped, and positioned with respect to the first base region, to be in contact with a side of the first hand while the palm of the first hand is in contact with the first base region;
    a second base region, adjacent the first base region, sized and shaped to be in contact with a palm of the second hand; and
    a second side region sized and shaped, and positioned with respect to the second base region, to be in contact with a side of the second hand while the palm of the second hand is in optical contact with the second base region.

11. The optical element of claim 10, wherein the first side region includes a first side platen surface and the second side region includes a second side platen surface substantially parallel to the first side platen surface.

12. The optical element of claim 10, wherein the first side region includes a first side platen surface and the second side region includes a second side platen surface opposite the first side platen surface, and wherein a separation distance between the first and second side platen surfaces is tapered.

13. The optical element of claim 10, further comprising at least one holographic element positioned to result in total internal reflection in at least one of the first base region, the first side region, the second base region, and the second side region.

14. The optical element of claim 10, wherein at least one of the first base region, the first side region, the second base region, and the second side region is coated with an optically transparent material.

15. The optical element of claim 14, wherein the optically transparent material is silicone.

16. A print scanner for scanning an underside of a hand including a palm, and hypothenar and writer's palm regions on a side of the hand extending up from the palm, comprising:
    a transparent tray platen apparatus for receiving an underside of a hand having a print pattern;
    a holographic element coupled to the transparent tray platen apparatus; and
    a scanning assembly for scanning the print pattern through the holographic element to capture an image of the scanned print pattern including the print pattern at or near a palm pocket, a hypothenar region, and a writer's palm.

* * * * *